Patented Nov. 13, 1928.

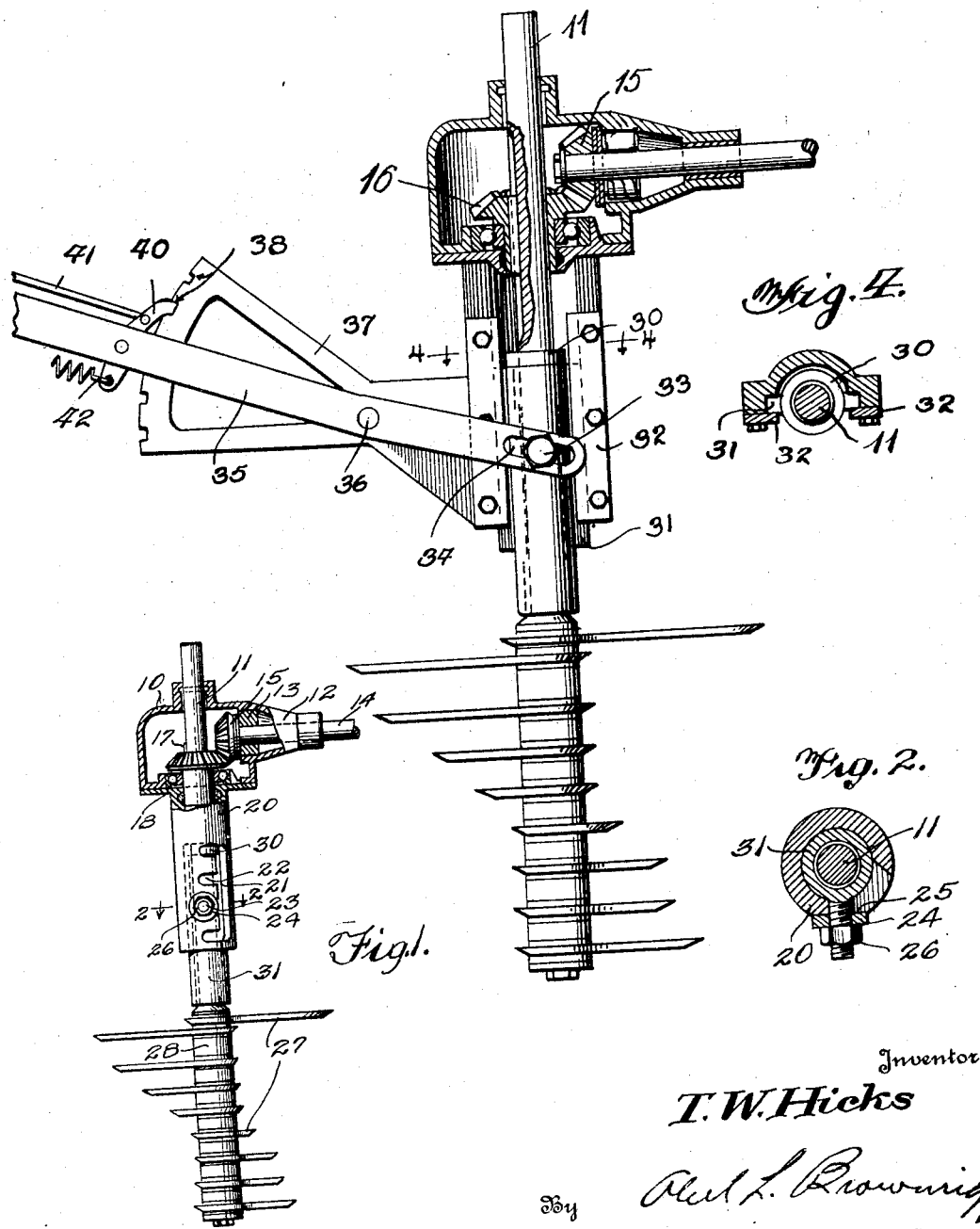

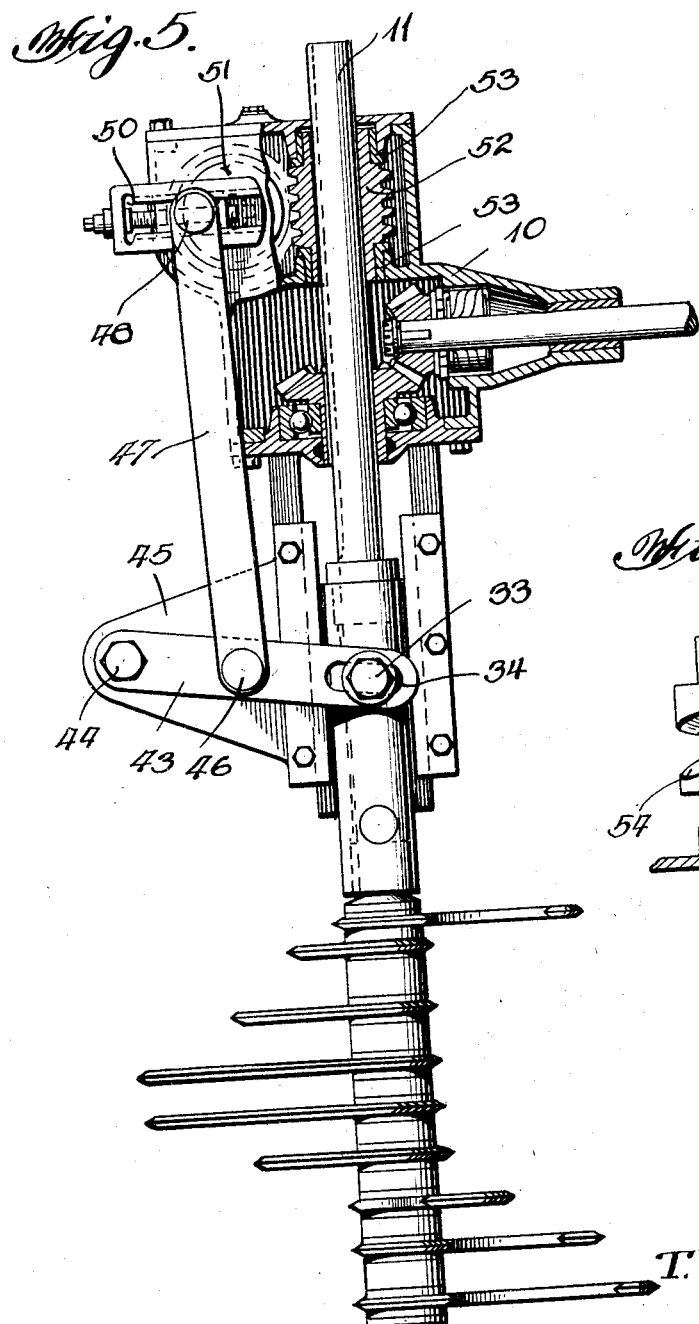

1,691,351

UNITED STATES PATENT OFFICE.

THOMAS W. HICKS, OF MINNEAPOLIS, MINNESOTA.

TILLER.

Application filed March 29, 1923. Serial No. 628,643.

This invention relates to improvements in tillers and more particularly to that general type of apparatus illustrated and described in my prior Patent No. 1,320,469, dated November 4, 1919, for improvements in tillers.

In order that a clearer perception of the present invention may be had and the objects sought to be accomplished thereby, it may be stated that under various soil conditions in different sections of the country, it is frequently desirable to till the soil to a greater or lesser depth, thereby avoiding turning up what is technically known as "raw" soil in greater quantities than desired or than is consistent with good farming practice. In some soils where an excessive amount of moisture is present, the furrow slice has a tendency to climb up over the mold-board of the plow. By adjusting the tiller shaft relatively thereto, the upper knives will engage the top portion of the furrow and prevent these undesirable conditions.

It is also desirable at times to provide wavy or undulating contours to the seed bed and this may be accomplished by raising and lowering the tiller with respect to the plow. This is especially desirable when plowing on a hillside where the gradation is such as to cause a too rapid draining off by rainfall and washing away of the soil, in which case a waving contour would serve to retain a large portion of the moisture, which in turn would find its way into the sub-soil of the field. It may also be desirable to entirely elevate the tiller with respect to the plow in order to escape visible obstructions, such as rocks or tree roots.

It is, therefore, one of the objects of the present invention to provide a simple and practical mechanism associated with the tiller, whereby the tiller shaft may be easily and quickly moved relatively to the plow in a general vertical direction or in the direction of the axis of the tiller, either manually, automatically or permanently adjustable as desired.

A further object is to provide mechanism of the above general character which will be durable in construction and reliable and efficient in use and operation.

A further object is to provide mechanism of the above general character which may be inexpensively manufactured, assembled and installed in connection with plows now in general use.

Other objects will be in part obvious from the annexed drawing and in part indicated in connection therewith in the following analysis of the invention.

The invention accordingly consists in the features of construction, the combination of parts, and in the unique relation of the various members and the relative proportioning and dispositioning thereof, all as more clearly outlined herein.

To enable others skilled in the art to fully comprehend the underlying features thereof in order that they may embody the same, by numerous modifications in structure and relation contemplated by this invention, drawings depicting a preferred form of the invention have been annexed as part of this disclosure and in such drawings like characters of reference indicate corresponding parts throughout all the views, of which—

Fig. 1 is a detail vertical elevational view, partly in section, of one form of tiller shaft capable of vertical adjustment as desired;

Fig. 2 is a detail cross sectional view substantially along the line 2—2 of Fig. 1;

Fig. 3 is a view similar to Fig. 1, showing a different embodiment permitting rapid vertical adjustment as and when desired by the operator;

Fig. 4 is a detail section view taken substantially along the lines 4—4, Fig. 3;

Fig. 5 is a view similar to Figs. 1 and 3, showing a further modification of means for moving the tiller shaft in the direction of its axis whereby the seed bed or surface of the soil is automatically given an undulating surface;

Fig. 6 is a detail view showing a further mechanism for automatically reciprocating the tiller shaft.

Referring now to the drawings in detail, and more particularly to Fig. 1, 10 denotes a casing adapted to be suitably mounted upon a plow frame in any desired manner and carrying a vertically disposed tiller shaft 11 which may be adjusted in the direction of its axis relative to the housing. This housing is provided at one side with an auxiliary housing 12 containing roller bearings 13 for supporting a main drive shaft 14 which is provided at one end with a power transmitting means such as a bevel gear 15. The opposite end of this shaft is adapted to be driven from any suitable source of power and at a relatively high speed. This bevel gear 15 meshes with a second bevel gear 16 splined as at 17 to the shaft 11, and is provided with roller bearings 18 for eliminating friction as much as possible. The lower part of the housing 10 is provided with a depending tubular casing 20 having a slot 21 and a plurality of offset slots 22 adapted to receive a lug or bolt 23 carried by a sleeve 31 and provided with a flat washer 24 engaging with a flattened part 25 of the casing 20 when in the position shown in Figure 2. A lock nut 26 holds the washer in place and the flat surfaces will prevent a relative rotation of the bolt 23 and sleeve 31.

The lower end of the tiller shaft 11 carries a plurality of soil engaging implements, such as blades 27 spaced apart one from another by the collars 28 in any desired manner. It is thus evident that the tiller shaft 11 carrying the blades may be manually raised or lowered by unscrewing the lock nut 26 which permits the sleeve 31 carrying the bolt 23 to be rotated and moved to any of the offset slots 22 as desired, whereupon by tightening the nut 26, the sleeve 31 is again rigidly held. A collar 30 on the shaft 11 rests on the upper end of the sleeve 31 and provides for adjustment of the shaft with the sleeve. The particular construction of the blades and spacing members forms no part of the present invention except as they may enter into the general combination and the details thereof will form the subject-matter of a separate application.

From the above, it will be seen that this embodiment provides for vertical movement of the shaft with respect to the plow by a simple and practical mechanical expedient in order that the tiller may have a proper operative relation with respect to the turned-over furrow, as may be decided upon by the varying soil conditions, as above explained.

The form shown in Fig. 3 is in many respects very similar to that above described in that the tiller shaft 11 is provided with a collar 30 resting on the upper end surface of a sleeve 31 adapted to slide in vertically disposed guides 32. This sleeve is provided with a nut 33 coacting with a slot 34 at one end of a hand operated lever 35 pivoted at 36 in a suitable fixed part of the frame of the plow. In the present case, a bracket 37 is provided with teeth 38 adapted to receive the end of a pawl 40 manually released through the rod 41 and normally held in engagement with the rack by a spring 42. With the mechanism here employed the operator is enabled to move the tiller shaft vertically or in the direction of its axis by simply moving the lever 35 about its pivot point 36 for the purpose of raising or lowering the tiller, as circumstances may require. Thus, on the side of a hill, by adjusting the tiller shaft at proper depth with respect to the plow point, the earth may be thrown further up the hill to leave the soil in a relatively level condition with respect to the contour of the hill. If some particular part of the field happens to contain an excessive amount of moisture causing the furrow to climb up over the mold-board, the tiller may be raised to ensure the top knives engaging the top portion of the furrow and thereby prevent this climbing action.

The modification shown in Fig. 5 is substantially the same in many details as the forms above described and shown in Figures 1 and 3. In this form, however, a relatively short lever 43 is used, pivoted at one end 44 to a relatively fixed part of the frame such as bracket 45, the opposite end of which lever is provided with a similar slot 34 engaging the lug or nut 33. The central portion of the lever 43 is pivotally connected at 46 with one end of a link 47, the opposite end of which is pivotally connected at 48 with a sliding adjustable eccentric block 50. This block is mounted in a crank arm 50' attached to a gear 51 meshing with a worm 52 splined to the tiller shaft 11 and mounted in suitable bearings 53 in the housing 10. Thus, as the tiller shaft is rotated, the worm will cause the gear 51 to rotate and the block 50 will move in a circle to cause a relative up and down movement of the lever 47, thus reciprocating the tiller shaft and automatically producing a waving or undulating seed bed.

By adjusting the block 50 in the arm 50' towards or away from the center of the gear 51, a variable throw will be obtained whereby to produce a greater reciprocation of the tiller shaft. On the other hand, by moving the block into a position coincident with the axis of the gear 51, the reciprocation will be entirely eliminated and the tiller shaft will have a certain predetermined adjusted relation with respect to the plow.

The mechanism shown in Figure 6 accomplishes substantially the same results in a slightly different way. In this form, the upper end of the tiller shaft 11 is provided with a cam 54, coacting with a fixed roller 55 mounted in the housing 10 or an extension thereof whereby as the tiller shaft rotates it will automatically move in the direction of its axis.

It is believed to be unnecessary to describe more in detail the operations of these various mechanisms, and it is sufficient to state that all of them are designed to obtain in various ways a relative movement of the tiller shaft in the direction of its axis and with respect to the plow, as may be desired. In some cases, a relatively permanent adjustment will be sufficient, while in others an occasional manual adjustment at will is desired, while in still others a continuous undulating surface to the seed bed is to be preferred.

It is thus seen that the present invention provides a simple and practical mechanism adapted to accomplish, among others, all of the objects and advantages herein stated.

Without further analysis, the foregoing will so fully reveal the gist of this invention that others can, by applying current knowledge, readily adapt it for various applications without omitting certain features that from the standpoint of the prior art fairly constitute essential characteristics of the generic or specific aspects of this invention and, therefore, such adaptations should and are intended to be comprehended within the meaning and range of equivalency of the following claims.

What I claim is:

1. In a tillage implement, a substantially vertical rotatable and longitudinally adjustable shaft provided with horizontally extending tiller blades, a bracket member for supporting the shaft adjacent only at its upper end, driving means for the shaft carried by the bracket, a sleeve enclosing the shaft and vertically adjustable with relation to the bracket, and a collar on the shaft resting on the upper edge of the sleeve whereby vertical adjustment of the sleeve will correspondingly adjust the tiller shaft.

2. In a tillage implement, a substantially vertical rotatable and longitudinally adjustable shaft provided with horizontally extending tiller blades, a bracket member for supporting the shaft adjacent its upper end, only driving means for the shaft carried by the bracket, a depending member on the bracket, a sleeve enclosing the shaft and vertically adjustable with relation to the depending member, means for clamping the sleeve to the depending member in the different positions of adjustment, and a collar on the shaft bearing against the upper end of the sleeve, whereby vertical adjustment of the sleeve correspondingly adjusts the vertical position of the tiller shaft.

3. In a tillage implement, a substantially vertical rotatable and vertically adjustable shaft provided with vertically spaced horizontally extending tiller blades, a housing bracket in which the shaft is supported adjacent its upper end only, a substantially horizontal driving shaft and a gear connection in said housing between the driving shaft and the tiller shaft, a casing depending from said housing, a sleeve vertically adjustable in said casing and through which the tiller shaft passes, and a collar on the shaft bearing against the upper end of the sleeve, whereby vertical adjustment of the sleeve correspondingly adjusts the vertical position of the tiller shaft.

4. In an apparatus of the character described, in combination, a housing, a vertically disposed tiller shaft, a gear splined thereto, a driving shaft, a gear thereon coacting with said first mentioned gear, means for adjusting said tiller shaft vertically with respect to its driving gear, said adjusting means comprising a sleeve, in which the shaft is free to rotate a lug on said sleeve, a member having a vertically disposed series of notches to receive said lug in the various positions of adjustment, and said shaft being vertically adjustable with said sleeve.

5. In an apparatus of the character described, in combination, a housing, a tiller shaft mounted therein, a driving shaft, splined power transmitting means between said tiller shaft and driving shaft whereby said tiller shaft may have a relative movement in the direction of its axis and with respect to said driving shaft, a sleeve for holding said tiller shaft in adjusted position, a support for said sleeve, horizontal slots in said support, and a lug carried by the sleeve adapted to co-act with said horizontal slots.

In testimony whereof I affix my signature.

THOMAS W. HICKS.